June 21, 1966  H. J. SIEGEL  3,256,765
MUSIC TEACHING DEVICE
Filed April 27, 1964  6 Sheets-Sheet 1
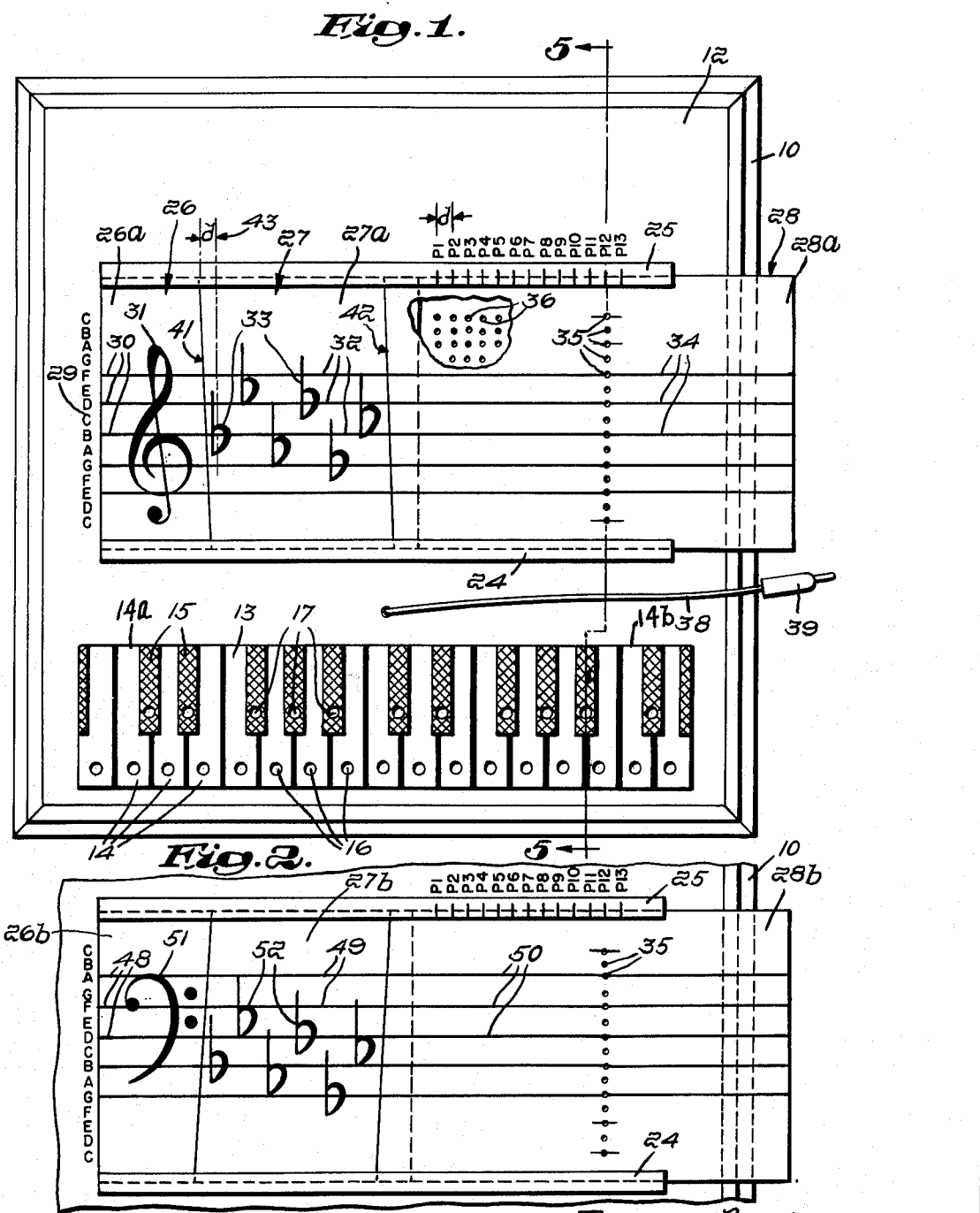
Inventor:
Harold J. Siegel,
by Arthur D. Thomson
Attorney

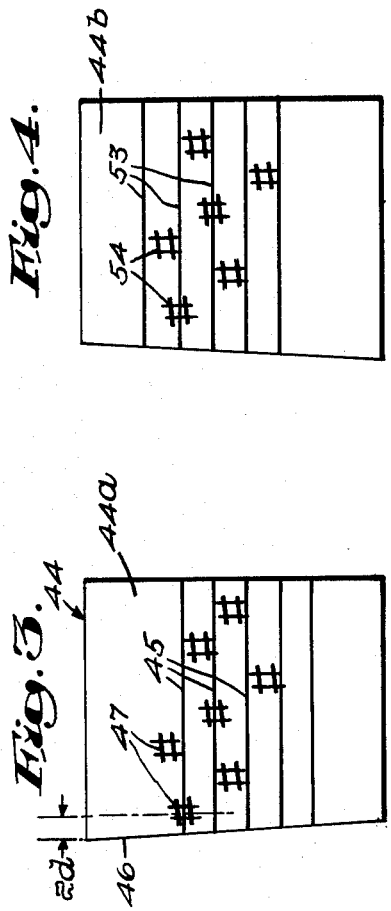
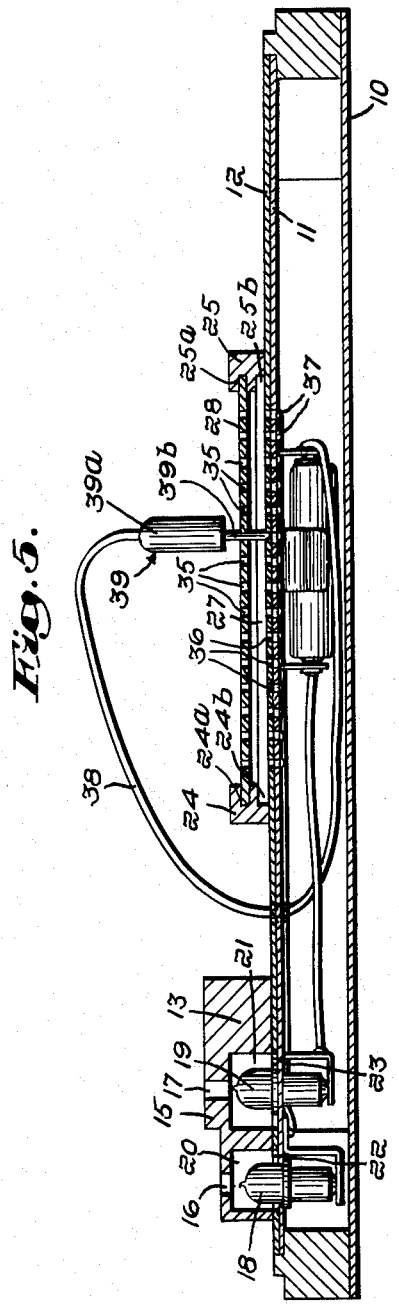

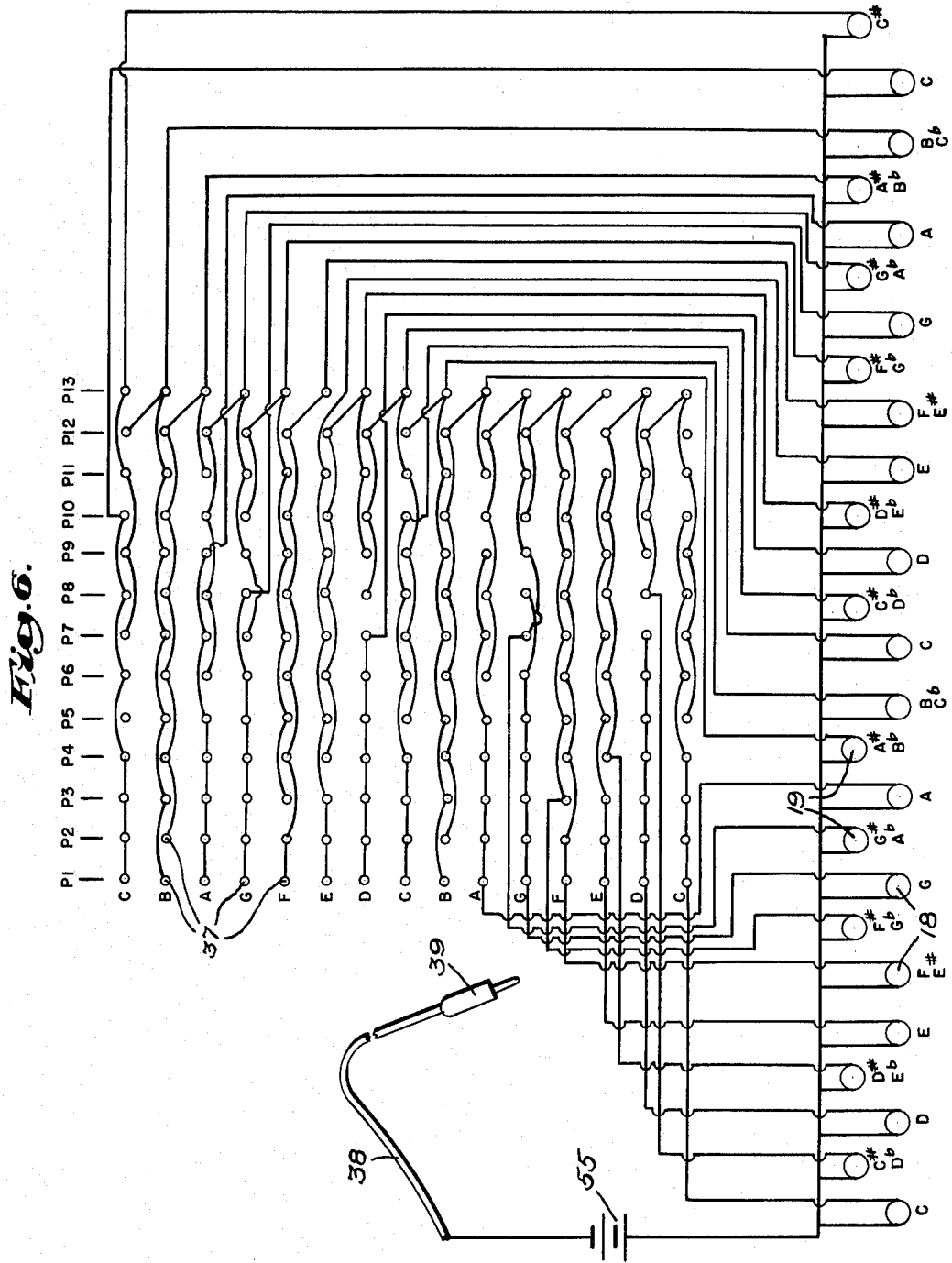

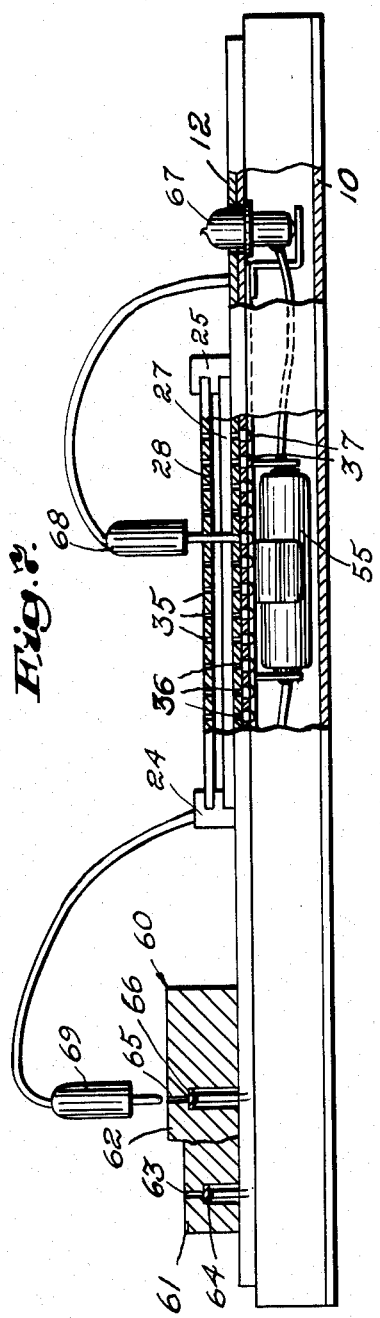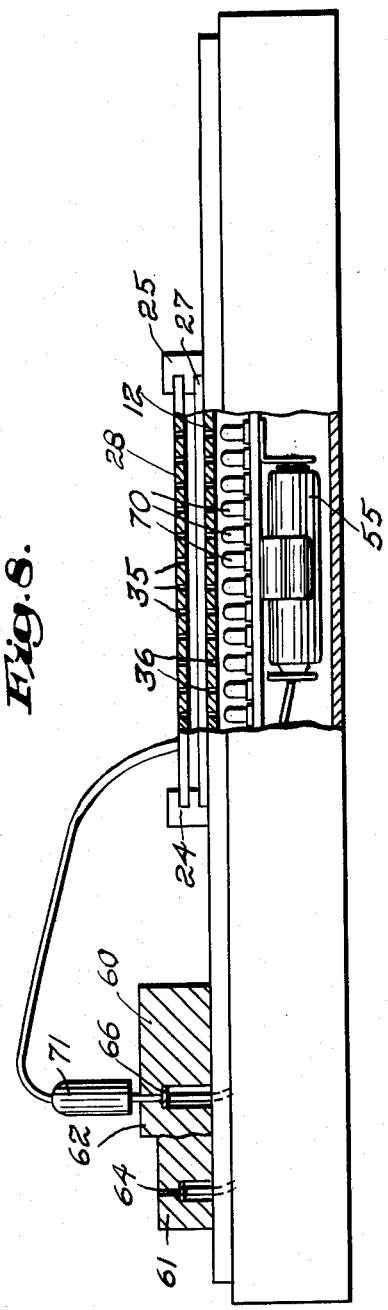

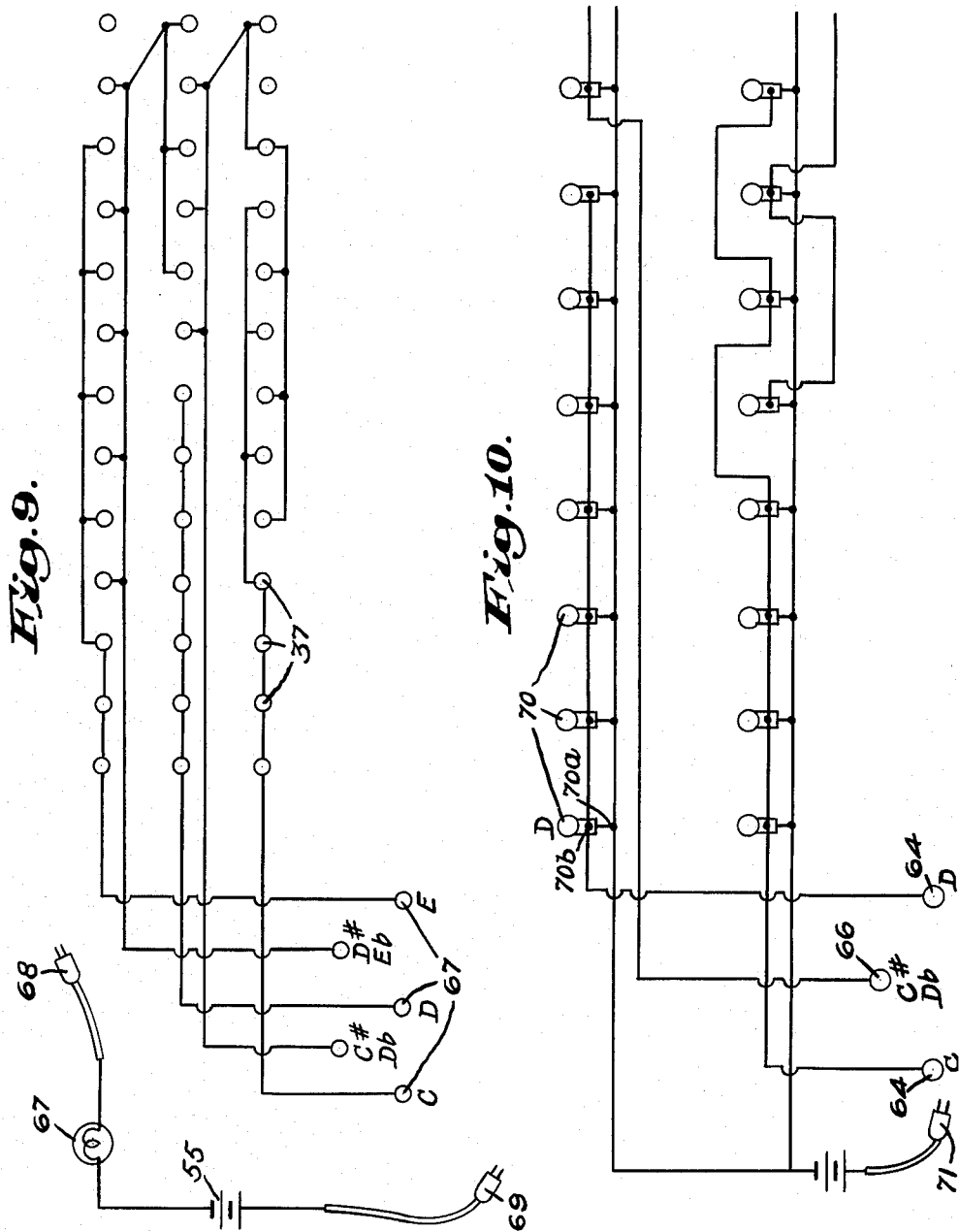

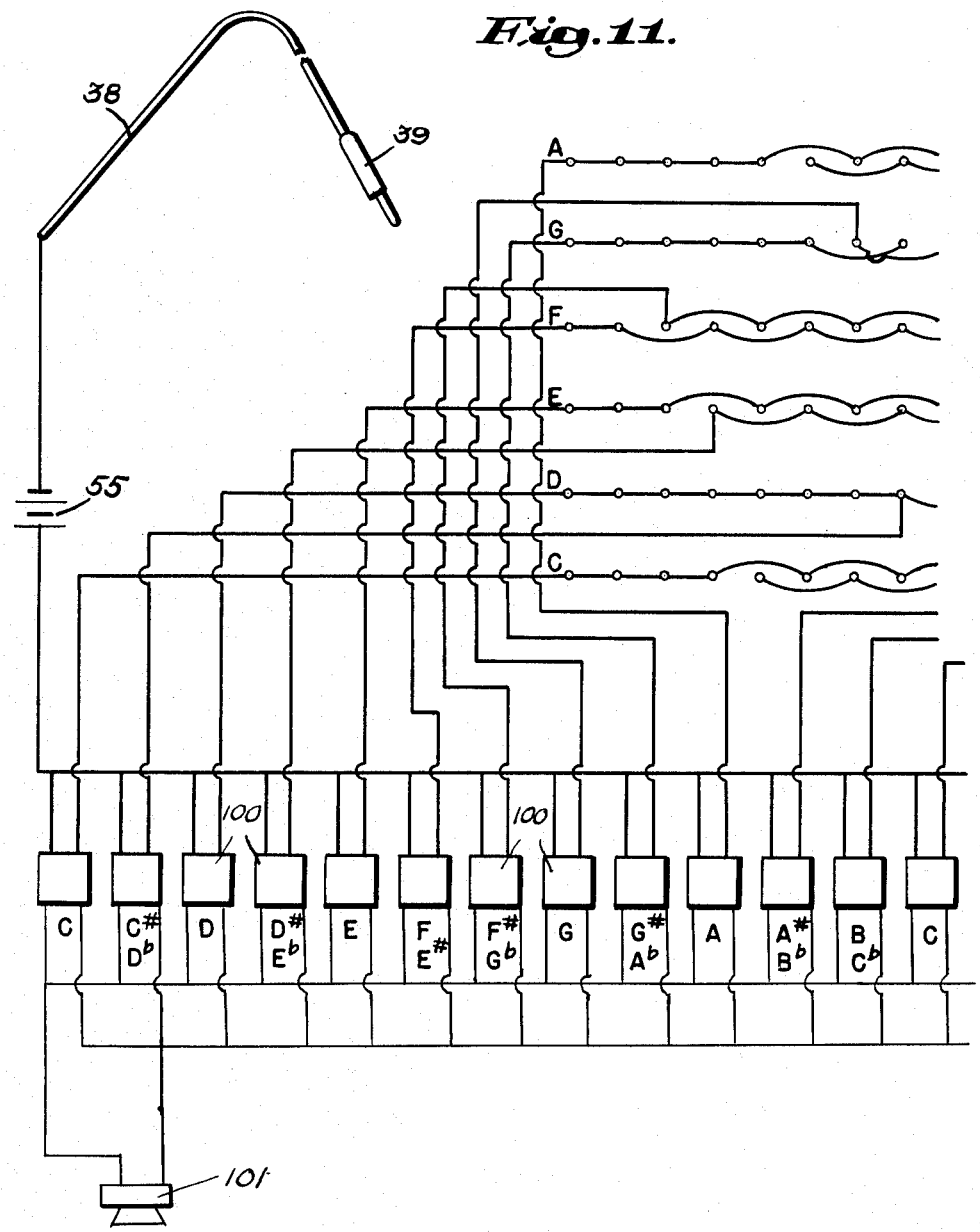

United States Patent Office 3,256,765
Patented June 21, 1966

3,256,765
MUSIC TEACHING DEVICE
Harold J. Siegel, 415 Lowell Ave., Newtonville, Mass.
Filed Apr. 27, 1964, Ser. No. 363,350
14 Claims. (Cl. 84—478)

This invention relates to teaching devices, and pertains more particularly to devices for teaching a piano student to read music. The present application is a continuation-in-part of my application Serial No. 232,481, filed October 23, 1962.

The piano keyboard is made up of sets of seven white keys, each producing a note in the C scale, conventionally designated by the letters A through G, and five black keys, producing half-tones used in the scales other than the C scale, conventionally designated as sharps or flats of the adjacent white notes. Conventional written notation for piano music is based on a staff or set of five lines and four spaces, each line and space representing one of the letter designations. The treble signature symbol, 𝄞, placed at the beginning of the staff indicates that the staff refers to notes above middle C on the piano, and the bass signature symbol, 𝄢, indicates that the staff refers to notes below middle C. The sharps or flats are indicated by symbols placed on appropriate lines or spaces on the staff.

The task of learning to read music involves an enormous amount of memorization. In order to identify the key on the piano corresponding to a note on the manuscript, the student must be able to determine which letter in the A to G notation the line or space represents, which octave on the keyboard it is in and, by referring back to the sharp or flat signature, whether the note should be played as a sharp, one-half tone above, or a flat, one-half tone below, the key representing the designated letter. The notation system is very confusing to the beginner because of its lack of consistency. The lines and spaces in the treble staff do not represent the same letters as those in the bass. A certain letter is represented by a line in one octave and a space in the next, and many of the keys on the keyboard may be represented in alternative ways in the written notation. For example, the lowest in the group of three black keys may be written as F sharp or G flat. B may be written as C flat, and C as B sharp.

After the student has mastered the notation system, he often has difficulty in building up speed and facility in reading, because he is in the habit of going through the mental process of determining cleff, letter, octave, and sharp or flat each time in order to find the proper key on the keyboard.

The object of this invention to to provide a teaching device which makes it possible for a person who is familiar with the music notation system to learn to read piano music in a short time, and which accustoms the student to associating the written notation directly with the piano keys, thus helping him to achieve adequate reading speed. Another object is to provide a device which is simple enough to operate so that it can be used even by young children. A further object is to provide a device which is compact enough to be readily portable and is inexpensive to manufacture.

Other objects, advantages, and novel features will be apparent from the following description.

The device, in one form, consists essentially of a representation of a portion of the piano keyboard having a light behind each note, a frame in which a cleff card carrying the cleff symbol and a key signature card carrying sharp and flat signatures may be arranged in various manners, together with a note card carrying columns of holes representing the position of notes on the written notation, and an electrical system which automatically illuminates the appropriate key when a contact probe is inserterred in one of the holes. The note card is slidable over the key signature card, and the electrical system includes a matrix of contacts having columns with which the holes in the note card may be selectively aligned. The contacts are wired in such a manner that when the note card is in a position to expose a given number of sharps or flats on the key signature card, insertion of the probe in a hole corresponding to a sharp or flat note will illuminate the appropriate sharp or flat key on the simulated keyboard. In a modified form, the positions of the probe in a contact on the keyboard illuminates a corresponding note on the note card. In this case the light behind a hole in the note card will be illuminated only if the selected contact on the keyboard corresponds to a note in the musical scale represented by the sharps or flats exposed on the key signature card. In still another modification, contacts are substituted for the lights on the keyboard and two probes are used, with a single signal lamp. The lamp indicates whether the key corresponding to the sharp, flat, or material of a note is correctly selected in accordance with the exposed sharps and flats on the key signature card. In still another modification the circuits energize an electrical sound device which emits an audible signal corresponding to a selected note. To use the device in one manner when learning to read a piece of music, the student looks at the note in the manuscript, inserts the probe at the corresponding position in the guide card, and then plays the piano key corresponding in position to the one illuminated on the simulated keyboard. In a form which produces an audible signal, the student hears the tone and then tries to play a note of corresponding sound on the piano.

In the drawings illustrating the invention:

FIG. 1 is a plan view of a teaching device constructed according to the invention, showing the cleff card, flat signature card, and guide or note card in a typical arrangement for representing the treble cleff;

FIG. 2 is a plan view of the frame portion of the device showing the cleff card, flat signature card, and note card in a typical arrangement for the bass cleff;

FIG. 3 is a plan view of the treble face of the sharp signature card;

FIG. 4 is a plan view of the bass face of the sharp signature card;

FIG. 5 is a cross-section taken along line 5—5 of FIG. 1;

FIG. 6 is a schematic view of the contact matrix, key lights and electrical connections;

FIG. 7 is a partial cross-section, similar to FIG. 5 illustrating a modification of the device;

FIG. 8 is a similar partial cross-section illustrating another modification of the device;

FIG. 9 is a partial wiring diagram of the device of FIG. 7;

FIG. 10 is a partial wiring diagram of the device of FIG. 8; and

FIG. 11 is a partial schematic view of the contacts and electrical connections of a modified form of the device intended to produce audible tones.

The parts of the device are mounted in a shallow frame or tray 10. A base plate 11, made of insulating material such as rigid plastic sheet, is mounted in the frame and covered by a panel 12, also made of non-conductive material such as plastic or stiff paper board. Disposed along the lower portion of the panel 12 is the simulated keyboard 13, which may be made of any suitable material, such as wood or molded plastic. The upper face of this "keyboard" is painted or printed with dividing lines to simulate the appearance of "keys" 14 corresponding in arrangement to the white keys on a piano, and has raised portions 15, preferably colored black, grouped in twos and threes to simulate the appearance and arrangement of the black keys on a piano. Each of the white and black "keys" has a hole, 16 and 17, respectively, and a series of light bulbs 18 and 19, mounted on plate 11, are disposed below the holes. The simulated keyboard 13 has grooves 20 and 21 to accommodate the bulbs 18, 19 which projects up through slots 22 and 23 in panel 12.

Mounted on the upper portion of panel 12 is a pair of open-ended tracks 24 and 25, each having an upper groove 24a, 25a, respectively, and a lower groove 24b, 25b, respectively. A cleff card 26 and a key signature card 27 are slidably received in the lower grooves 24b, 25b, and a guide or note card 28 is slidably received in the upper grooves 24a, 25a. The cards may be made of stiff paper board, plastic sheet, or other suitable material. The simulated keyboard is here illustrated as representing two octaves of the C scale on the piano, and the cards are of a height to accommodate notations of the fifteen corresponding notes. For convenience, the panel 12 may carry markings 29 to one side of the tracks indicating the positions of the notes by their customary alphabetical designations.

The cleff card 26 has a treble face 26a, which is disposed upward in FIG. 1, bearing a staff of five lines 30 disposed at the positions of notes E G B D F, and the treble cleff symbol 31. The key signature card 27 likewise has a trebleface 27a, bearing staff lines 32 in the appropriate positions, and also having six flat symbols 33 disposed in the customary arrangement.

The note card has a treble face 28a carrying staff lines 34 aligned with lines 30 and 32. The note card also has a column of fifteen holes 35 disposed in position corresponding to the fifteen notes of the two octave range covered by the device. The bottom hole corresponds to middle C and the top to high C, represented by keys 14a and 14b, respectively, on the simulated keyboard in FIG. 1. The note card is slidable sidewise to align the column of holes 35 with any one of thirteen equally spaced markings P1 through P13 on track 25.

The panel 12 has a matrix of holes 36, arranged in thirteen vertical columns aligned with markings P1 through P13 and fifteen horizontal rows aligned with the fifteen holes 35. Panel 11 carries a corresponding matrix of contacts 37 similarly arranged in thirteen vertical columns and fifteen horizontal rows. Extending through panel 12 is a flexible cable 38, on the end of which is mounted a probe 39 consisting of an insulating handle 39a and a conductive tip 39b. When the tip is inserted into one of holes 35 it passes through whichever of the holes 36 is aligned with the selected hole 35 and engages the corresponding contact 37.

The cleff card 26 has an oblique right-hand edge 40 and the key signature card has a mating oblique left-hand edge 41. The note card has a left-hand edge 42 parallel to edge 41. The first flat symbol 33, or B flat, is disposed on a dot and dash line 43 which is horizontally spaced from the upper left-hand corner of card 27 by a distance d equal to the distance between two adjacent markings P1, P2. The next flat symbol in the series, or E flat, is horizontally spaced from the first by twice that distance, and the subsequent symbols in the series are similarly spaced from one another. When edge 42 of the note card 28 is aligned with edge 41, all the flat symbols are covered, holes 35 are aligned with the column of holes 36 and contacts 37 aligned with mark P1. This column corresponds to the key of C in the musical scale. By moving card 28 to the right by a distance d, the B flat symbol is exposed. Holes 35 are then aligned with the P2 column of holes 36 and contacts 37. If the card is moved an additional distance of twice d, the E flat symbol is exposed and holes 35 are aligned with the P4 column. The contacts 37 in each of the even numbered columns are wired, as will be explained, to give indications corresponding to one of the flat keys in the musical scale.

To adapt the device to give representations of the sharp keys, the sharp signature card 44 is inserted in the tracks in place of card 27. This card has a treble face 44a bearing staff lines 45 arranged for the treble cleff. The sharp card has an oblique left edge 46 mating with edge 40. The first sharp symbol 47 in the series F sharp is horizontally spaced from the upper left-hand corner of the card by a distance equal to twice the distance d, and subsequent symbols in the series are similarly spaced from one another. Accordingly, when the note card is moved to a position to expose the F sharp symbol, holes 35 are aligned with the P3 column. The other odd numbered columns from P5 to P13 correspond to the other five sharp keys.

To arrange the device for study of the base cleff, the cards 26, 27, and 28 are turned upside down bringing their bass faces 26b, 27b, and 28b uppermost. These faces carry staff lines 48, 49 and 50, respectively, which are aligned with the positions of the notes G, B, D, F, according to the conventional base system. The top hole 35 now represents middle C on the piano. On the simulated keyboard, key 14b now represents middle C and key 14a the C two octaves below in the bass. The cleff card carries the bass cleff symbol 51, and the flat signature card carries the six flat symbols 52 arranged in the customary manner for the bass cleff notation. These symbols are horizontally spaced in the same manner as those on the treble face, so that exposure of any of the six flat signatures brings holes 35 in alignment with the appropriate even numbered column of holes 36 and contacts 37, as in the case of the treble cleff arrangement. The oblique edges of the three cards insure correct arrangement, as is immediately apparent if one of the cards is turned the wrong way.

The bass face 44b of the sharp signature card is shown in FIG. 4. On this face the card carries staff lines 53, in position to line up with the lines of the bass faces of the cleff and note cards, when the sharp signature card is substituted for the flat signature card. The bass face of the sharp signature card also carries the six sharp symbols 54 disposed in the customary positions of the bass cleff. The first sharp symbol F is horizontally spaced from the upper left-hand corner of the sharp signature card by a distance of twice d, and the rest of the symbols are similarly spaced from one another so that exposure of any of the six sharp key signatures causes holes 35 to to be aligned with one of the odd numbered columns of holes 36 and contacts 37 from P3 up, as in the case when the device is arranged for study of the treble cleff.

The wiring arrangement of the device is illustrated schematically in FIG. 6. As previously stated, light bulbs 18 are mounted on plate 11 in suitable positions to illuminate the white keys in the two octaves displayed by the simulated keyboard 13, and light bulbs 19 are disposed in positions to illuminate the black keys. Power is derived from a battery 55, which may be placed in any convenient location, and the light bulbs are all connected to one side of the battery. The probe lead 38 is connected to the other side of the battery. When the probe 39 engages one of the contacts 37, it completes the circuit to the bulb to which the contact is connected.

The matrix of contacts 37 are arranged in columns here identified as P1 through P13 to indicate their correspondence in position to those markings on the track. The horizontal rows are identified by the letters of the notes to which they correspond. The P1 column corresponds to the key of C, and it will be noted that the fifteen contacts in this column are connected to the lamps 18, illuminating the corresponding white key on the simulated keyboard.

The P2 column corresponds to the first flat key in the scale, that is the key of F in which B is played as a flat. In this column the contacts in rows corresponding to the B notes are wired to those lights 19 which are at the positions of the black B flat keys on the simulated keyboard. Similarly, in the P3 column, which corresponds to the first sharp key or the key of G in which F is played as a sharp, the contacts in the F rows are wired to those lights 19 which are at the positions of the black F sharp keys on the simulated keyboard. The remaining columns are wired, as is readily apparent from the drawing, in such a manner that those contacts in the rows corresponding to notes which should be played as sharps or flats are connected to the lights at the positions of the appropriate black keys. In certain cases, as is well known, the adjoining white key becomes the sharp or flat of a note. For example, E sharp is the same note as F on the piano. In the P13 column, which corresponds to six sharps, the E contacts are wired to the lights 18 at the positions of the white keys on the simulated keyboard. The wiring connections between the matrix of contacts 37 and the lights may be conveniently made by means of printed circuitry. Both faces of plate 11 may be utilized for this purpose.

To use the device, the student arranges the cleff, key signature and note cards, to correspond to the cleff and key signature on the manuscript of a piece he wishes to learn. The device may be made compact enough to set on the music rest alongside a piece of music. When he inserts the probe into the hole 35 which appears in the same position with respect to the staff lines on the note card as a note on the manuscript, the corresponding key on the simulated keyboard is lighted, showing him which key on the piano he should play. Because of the contact arrangement the notes which should be played as sharps or flats are automatically illuminated in the correct positions on the simulated keyboard so that he is able to play them correctly without having to refer back to the key signature on his manuscript.

In the form of device shown in FIG. 7, the arrangement of the contacts 37 is the same as in the first form. A simulated keyboard 60 has white "keys" 61 and black "keys" 62 is mounted on panel 12. Each of the keys 61 has a hole 63 leading to an electrical contact 64, and each of the keys 62 similarly has a hole 65 leading to a contact 66. A signal lamp 67 is mounted on panel 12, a pair of probes 68 and 69 are provided one connected to lamp 67 and one to battery 55.

The wiring of the device of FIG. 7 is illustrated in FIG. 9. The contacts 64 and 66 are connected to the matrix contacts 37 according to the same scheme as the lights 18 and 19 in FIG. 6. Only the first three rows are here shown, as the scheme of remaining connections will be readily understood from the previous description. Probe 69 is connected to one side of battery 55, and lamp 67 is connected in series between the battery and probe 68.

To use the device, the student inserts probe 68 through one of the holes 35 to engage one of the matrix 37. He then inserts probe 69 to engage one of the contacts 64 or 66 of the "key" on the simulated keyboard which he thinks corresponds to the note represented by the hole probe 68 is in. If he selects correctly, lamp 67 will light. If card 28 is set at a position calling for a sharp or flat of a note, for example, in the fourth column calling for E flat, the lamp will light only if he inserts probe 69 into the contact of the appropriate sharp or flat key.

In the device shown in FIG. 8, a number of lamps 70 are mounted behind holes 36 in rows and columns corresponding to the arrangement of contacts 37 in the form previously described. This device uses the same simulated keyboard 60 as the device of FIG. 7, with contacts 64 and 66 in "keys" 61 and 62. A probe 71 is connected to one side of the batery 55. As exemplified in FIG. 10, the lamps all have their ground contacts 70a connected to one side of the battery. Their other contacts are connected to contacts 64 and 66 according to the same scheme as the matrix contacts 37 and lamps 18 and 19 in FIG. 6. When the probe 71 is inserted in one of the contacts 64 or 66, the lamps connected to the selected contact will be illuminated and the one which is behind a hole 35 of card 28 will be visible. This gives the student a visible indication of the note on the staff corresponding to the key he has selected on the simulated keyboard. As will be understood from the scheme of the matrix wiring previously described that, if card is at a position calling for a sharp or flat of the particular note, no light will be visible when he inserts the probe in the natural key. This gives him an indication that he is "playing" a note which is not in the scale of the musical key indicated by the exposed key signature symbols.

As an alternative to the lamps 18, 19 in the device of FIGS. 1–6, a series of audible tone producing devices may be used, for example, a number of oscillatory circuits adapted to produce in an audio speakers, tones of frequencies corresponding to the notes on a piano. The matrix contacts 37 are wired in that case to the input junctions of the circuits, or the inputs may be wired in parallel with the lamps 18, 19 to produce both a visual and an audible signal.

This device provides many advantages over the old system of teaching which dequires the student to learn by rote the rather complex system of alphabetical and sharp and flat designations and their corresponding positions on both the written manuscript and the piano keyboard. A beginning student who has no familiarity with the notation system, can quickly acquire sufficient reading skill to read and play simple pieces, thus achieving a feeling of satisfaction and accomplishment which encourages him to continue his study. The concept of teaching a student to read by directly associating the position of a certain note on the written manuscript with a certain key on the keyboard is psychologically sound. A student who learns to read in this manner finds it easier to build up his sight reading speed than would one who is accustomed to going through the mental process of first associating the written note with a letter and then connecting the letter with a position on the keyboard. Furthermore, a student can start immediately to read and practice pieces in any of the twelve sharp and flat keys, so that the manipulation of the black keys on the piano does not seem strange or difficult, as it often does to a student who first learns to play pieces written only in the key of C.

The device may also be used to familiarize a student with the alphabetical notation system. By reference to the markings 29 at the side of card tracks, he can see, for example, which line or space on the staff corresponds to the letter A, and by inserting the probe in the A hole he learns which key is A on the piano keyboard.

Another way in which the device can be used is for silent practice during period when the student does not have access to a piano. By inserting the probe in various holes and observing which key is illuminated on the simulated keyboard, the student can improve both his direct mental association between positions on the staff and positions on the keyboard, and his knowledge of the alphabetical notation system.

It is understood that the construction device may be varied. For example, the device, as illustrated, covers a span of two octaves, but the staff display simulated keyboard, and electrical contact system can readily be designed to cover a longer or shorter range.

The device is here illustrated as adapted for training a student on the piano or an instrument having a similar keyboard. It is understood, however, that the device may be constructed according to the principle of the invention to give a direct visual representation of the positions of notes corresponding to those of the written notation on other types of instruments. For example, the simulated keyboard may be replaced by a representation of the strings or valves of a string or wind instrument, and the lamps and contacts connections arranged so that the appropriate position or valve is illuminated when the probe is inserted in one of the holes in the staff card. Accordingly, the term "keys" and "keyboard," as herein used in the claims, is understood to include string positions, valves and similar elements which a player manipulates to produce various notes on a musical instrument or, in the musical tone associated therewith. Other modifications may be made, within the scope of the appended claims, without departing from the teachings of this disclosure.

What is claimed is:

1. A music teaching device comprising a member bearing a representation of a musical staff, means representing keys of a musical instrument, signalling means, means for operating said signalling means to indicate correspondence between a key and a note on said staff, and means for selectively rendering said signalling means operable only for corresponding keys and notes in a selected one of a number of musical scales.

2. A music teaching device comprising a member bearing a representation of a musical staff, means representing keys of a musical instrument, electric signalling means, a number of energizing circuits for said signalling means, a set of contacts, each contact in said set being connected in one of said circuits, a manually operable contactor engageable with any selected one of said contacts and adapted to close the energizing circuit in which the selected contact is connected, and means for rendering said signalling device operable only when the contact engaged by said contactor represents correspondence between a key and a note in a selected one of a number of musical scales.

3. A music teaching device as described in claim 2, said means representing keys comprising a simulated keyboard including representations of individual keys, and said signalling means comprising a number of lamps one disposed at the position of each of said keys, said contacts being arranged in the positions of notes on said staff.

4. A music teaching device as described in claim 2, said signalling means comprising a number of tone producing devices and said contacts being arranged in the positions of notes on said staff.

5. A music teaching device as described in claim 2, said means representing keys comprising a simulated keyboard including representations of individual keys, and said signalling means comprising a number of lamps disposed at the positions of notes on said staff and said contacts being disposed one at the position of each of said keys.

6. A music teaching device as described in claim 2, said contacts being disposed at the positions of notes on said staff, said means representing keys comprising a simulated keyboard having representations of individual keys, said device having a second set of contacts disposed at the positions of said keys, and said contactor comprising a pair of probes, each adapted to engage a contact in one of the sets.

7. A music teaching device as described in claim 2 having means for displaying the key signature of the selected musical scale for which said signalling device is rendered operable.

8. A music teaching device comprising a number of simultated keys arranged to simulate the keyboard of a musical instrument, a number of electric illuminating devices each being adapted when energized to illuminate one of said keys, a number of energizing circuits for said devices, a number of sets of contacts, each contact in a set being connected in one of said circuits, a manually operable contactor engageable with any selected one of said contacts and adapted to close the energizing circuit in which the selected contact is connected, a mask overlying said contacts and bearing a representation of a musical staff and having a set of holes disposed with respect to said staff in positions representing the notes in written musical notation, said mask being movable to bring said holes into register with the contacts of any selected set, thus permitting their engagement by said contactor, each contact being connected in the energizing circuit of the illuminating device associated with the key which corresponds to the note represented by the hole registrable with that contact.

9. A teaching device as described in claim 8, the contacts in each of said sets being connected to illuminate the keys contained in different musical scales.

10. A teaching device as described in claim 8, said keyboard including sharp and flat keys, said device having a key signature indicator bearing a number of key signature symbols, and said masking device overlying said indicator and exposing different numbers of said symbols when said holes are aligned with different ones of said contact sets, the contacts in the respective sets being connected to permit illumination of the sharp and flat keys included in the musical scale corresponding to the key signature represented by the symbols exposed when said holes are aligned with any set.

11. A teaching device as described in claim 8, said mask having a front face bearing the aforementioned staff and a rear face bearing a second staff, and being reversible to expose said faces alternatively, the device including means for aligning said mask so that the staff on one of said faces when exposed is aligned with contacts corresponding to appropriate keys in the treble cleff, and the staff on the other face when exposed is aligned with contacts corresponding to appropriate keys in the bass cleff.

12. A music teaching device comprising a number of simulated keys arranged to simulate the keyboard of a musical instrument, a number of electric illuminating devices each being adapted when energized to illuminate one of said keys, a number of energizing circuits for said devices, a matrix of contacts arranged in a succession of spaced columns and spaced rows, each contact being connected in one of said circuits, a manually operable contactor engageable with any selected one of said contacts and adapted to close the energizing circuit in which the selected contact is connected, a mask overlying said contacts and bearing musical staff lines aligned with certain of said rows and having a column of holes, each of said holes being aligned with one of said rows and disposed with respect to said staff in positions representing notes in written musical notation, said mask being slidable in the direction of said rows to bring said holes into register with any selected one of said contact columns, thus permitting engagement of the contacts in the selected column by said contactor, the contacts in each row being selectively connected to the illuminating devices associated with those keys corresponding to the natural, sharp, and flat of the note represented by the hole aligned with that row.

13. A teaching device as described in claim 12, one of the end columns in said matrix being so connected as to illuminate the keys contained in the C scale, the contacts in successive columns being connected alternately to illuminate the keys contained in scales including sharp and flat keys.

14. A teaching device as described in claim 12, including a key signature indicator adapted to selectively display sharp and flat symbols, said mask overlying said means and exposing, when aligned with any selected one of said columns, the symbols appropriate to scale to which the contact connections of the selected column correspond.

References Cited by the Examiner

UNITED STATES PATENTS

| | | | |
|---|---|---|---|
| 1,268,376 | 6/1918 | Miessner | 84—477 |
| 1,400,947 | 12/1921 | Fennell | 84—478 |
| 2,198,894 | 4/1940 | Werner | 35—9 |
| 2,586,710 | 2/1952 | Pick | 35—9 |
| 3,106,784 | 10/1963 | Raley | 35—9 |
| 3,141,371 | 7/1964 | Coles | 84—482 X |

FOREIGN PATENTS

| | | |
|---|---|---|
| 442,572 | 6/1912 | France. |
| 451,421 | 8/1936 | Great Britain. |
| 539,987 | 10/1941 | Great Britain. |

LEO SMILOW, *Primary Examiner.*

CHARLES M. OVERBEY, *Assistant Examiner.*